United States Patent
Thacker et al.

(10) Patent No.: US 8,828,122 B2
(45) Date of Patent: Sep. 9, 2014

(54) SYSTEM AND METHOD FOR GAS TREATMENT

(75) Inventors: Pradeep Stanley Thacker, Bellaire, TX (US); Sachin Suhas Naphad, Katy, TX (US); Rupinder Singh Benipal, Houston, TX (US)

(73) Assignee: General Electric Company, Schenectady, NY (US)

(*) Notice: Subject to any disclaimer, the term of this patent is extended or adjusted under 35 U.S.C. 154(b) by 140 days.

(21) Appl. No.: 13/544,948

(22) Filed: Jul. 9, 2012

(65) Prior Publication Data

US 2014/0007614 A1    Jan. 9, 2014

(51) Int. Cl.
*B01D 53/22* (2006.01)
*B01D 53/14* (2006.01)
*F25J 3/08* (2006.01)

(52) U.S. Cl.
USPC ............ 95/55; 95/235; 95/236; 96/4; 96/242; 62/617

(58) Field of Classification Search
CPC ............ B01D 53/229; B01D 53/1456; B01D 53/1462; B01D 53/1468; B01D 53/1425; B01D 53/047; B01D 2257/108; B01D 2257/302; B01D 2257/504; F25J 3/08; F25J 5/002
USPC ........ 95/55, 56, 137, 139, 235, 236; 96/4, 90, 96/234, 242; 62/617
See application file for complete search history.

(56) References Cited

U.S. PATENT DOCUMENTS

| | | | |
|---|---|---|---|
| 5,345,756 A | 9/1994 | Jahnke et al. | |
| 6,179,900 B1 * | 1/2001 | Behling et al. | 95/45 |
| 7,247,656 B2 | 7/2007 | Guo et al. | |
| 7,947,115 B2 | 5/2011 | Sullivan | |
| 8,202,349 B2 * | 6/2012 | Molaison | 95/51 |
| 8,419,829 B2 * | 4/2013 | Wallace | 95/55 |
| 2005/0150820 A1 * | 7/2005 | Guo | 208/370 |
| 2011/0030384 A1 | 2/2011 | Ku et al. | |
| 2011/0067302 A1 * | 3/2011 | Oppenheim et al. | 48/87 |
| 2011/0162382 A1 | 7/2011 | Riensche et al. | |

FOREIGN PATENT DOCUMENTS

WO    2009013455 A2    1/2009

OTHER PUBLICATIONS

EP Search Report dated Oct. 17, 2013 from corresponding EP Patent Application No. 13174911.1.
Grol, E, Integration of H2 Separation Membranes with CO2 Capture and Compression, National Energy Technology Laboratory, Nov. 30, 2009, pp. 1-116.
Maximum, Economical CO2 Capture for IGCC Power Plants, Eltron Research & Development Tech Brief, 2009, pp. 1-7.
Grimmer, P., et al., High-Pressure Operation of Dense Hydrogen Transport Membranes for Pure Hydrogen Production and Simultaneous CO2 Capture, Twenty-Third Annual International Pittsburgh Coal Conference, Sep. 26, 2006, pp. 1-21.

(Continued)

*Primary Examiner* — Jason M Greene
(74) *Attorney, Agent, or Firm* — Fletcher Yoder, P.C.

(57) ABSTRACT

A system includes an acid gas removal (AGR) system configured to remove an acid gas from an untreated syngas to generate a treated syngas, a hydrogen separation system configured to receive the treated syngas to generate a non-permeate and a permeate, and an expander configured to expand the non-permeate to generate a cooled non-permeate. The AGR system includes a solvent chiller configured to cool a solvent via heat exchange with the cooled non-permeate.

20 Claims, 2 Drawing Sheets

(56) References Cited

OTHER PUBLICATIONS

Carbo, M., et al., Advanced Membrane Reactors for Fuel Decarbonisation in IGCC:H2 or CO2 Separation, Fifth Annual Conference on Carbon Capture and Sequestration, May 8-11, 2005, pp. 1-15.

Williams, R., et al., Co-Production of Hydrogen and Electricity from Fossil Fuels with CO2 Capture, Second Annual Conference on Carbon Sequestration, May 5-8, 2003, pp. 1-11.

* cited by examiner

SYSTEM AND METHOD FOR GAS TREATMENT

BACKGROUND OF THE INVENTION

The subject matter disclosed herein relates to gas treatment systems, and, more particularly, to heat exchange in gas treatment systems.

Gas treatment may be used in refineries, petrochemical plants, natural gas processing plants, or other industries. For example, gas treatment may be used in integrated gasification combined cycle (IGCC) power plants to treat synthesis gas, i.e., syngas. Specifically, solvents may be used to absorb gases, such as hydrogen sulfide ($H_2S$) or carbon dioxide ($CO_2$), from the syngas in a gas treatment unit. The gas treatment unit typically may include one or more distillation columns. One or more of these columns may include a heat exchanger to remove heat from the solvent using a coolant, which may be cooled by a refrigeration system. Unfortunately, use of the refrigeration system may decrease the efficiency of the power plant and/or increase the capital expenditures associated with the power plant.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes an acid gas removal (AGR) system configured to remove an acid gas from an untreated syngas to generate a treated syngas, a hydrogen separation system configured to receive the treated syngas to generate a non-permeate and a permeate, and an expander configured to expand the non-permeate to generate a cooled non-permeate. The AGR system includes a solvent chiller configured to cool a solvent via heat exchange with the cooled non-permeate.

In a second embodiment, a system includes a gas treatment system and a gas treatment controller. The gas treatment system includes a hydrogen separation system configured to generate a non-permeate, an expander configured to expand the non-permeate to generate a cooled non-permeate, and a solvent chiller configured to cool a solvent via heat exchange with the cooled non-permeate. The gas treatment controller is configured to control the gas treatment system to maintain a temperature of the solvent below a threshold.

In a third embodiment, a method includes generating a non-permeate in a hydrogen separation system, expanding the non-permeate in an expander to generate a cooled non-permeate, cooling a solvent via heat exchange with the cooled non-permeate in a solvent chiller, and treating a gas using the solvent in a gas treatment unit.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
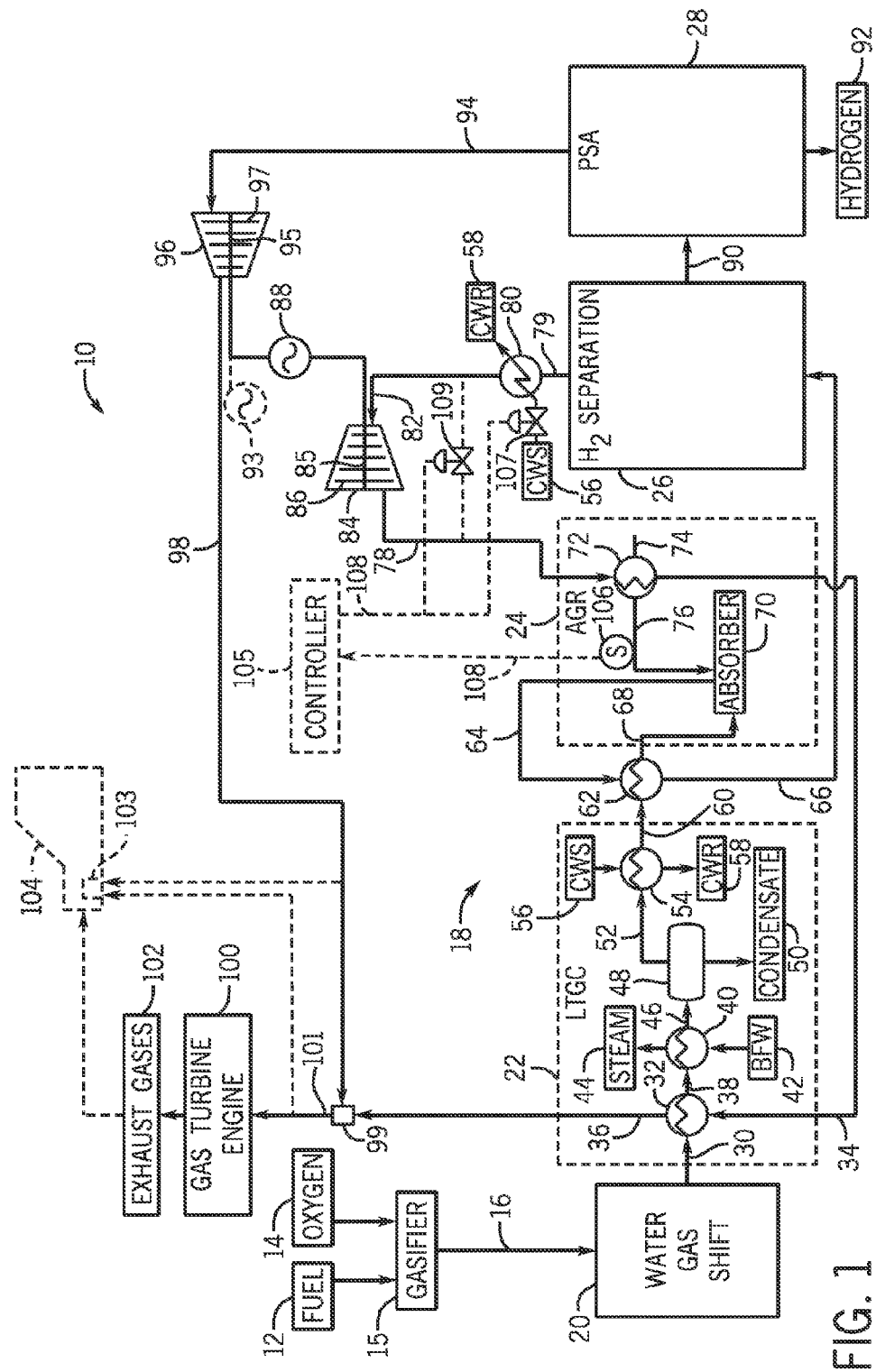
FIG. 1 is a block diagram of an IGCC power plant incorporating a gas treatment unit according to an embodiment.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Gas treatment is conducted in petrochemical plants, refineries, natural gas processing plants, and other industries. Although discussed in terms of an IGCC power plant below, the disclosed embodiments may be used in any of the plants listed above or wherever gas treatment is performed. In particular, an IGCC power plant may include a gas treatment unit to treat syngas produced by a gasifier. The gas treatment unit may include, but is not limited to, one or more of the following units: a water gas shift reactor, an acid gas removal (AGR) system, a hydrogen separation system, or a pressure swing adsorption (PSA) system. Each of these units may remove a gas and/or other components from the untreated syngas from the gasifier. For example, the acid gas removal system may remove $H_2S$, $CO_2$, and/or other acidic gases from the untreated syngas.

As discussed in detail below, certain embodiments provide systems (e.g., a gas treatment unit) that include the AGR system to remove the acid gas (e.g., $H_2S$) from the untreated syngas to generate a treated syngas. In addition, the system may include the hydrogen separation system to receive the treated syngas from the AGR system to generate a non-permeate and a permeate. Specifically, the permeate may be a hydrogen-rich stream and the non-permeate may be a hydrogen-lean stream. In further embodiments, the permeate stream may be processed in the PSA system to generate a tail gas and a further purified hydrogen-rich stream. The system may also include an expander, such as a turbine, configured to expand the non-permeate to generate a cooled non-permeate. The expander or turbine may include a rotating assembly, such as a shaft with blades attached, and a stationary assembly surrounding the rotating assembly. The cooled non-permeate may then be used elsewhere in the IGCC power plant for cooling purposes.

For example, in certain embodiments, the cooled non-permeate from the expander may be used for cooling in the AGR system. Specifically, the AGR system may include a solvent chiller to cool a solvent via heat exchange with the cooled non-permeate. The solvent may be used in the AGR system to remove the acid gas from the untreated syngas and the AGR system may operate more efficiently when the solvent is cooled. For example, refrigeration systems may be used to refrigerate the solvent in the AGR system. Unfortunately, use of such refrigeration systems may increase the complexity of the AGR system, decrease the efficiency of the AGR system, and/or increase the capital expenditures of the AGR system. By expanding the non-permeate in the expander to generate the cooled non-permeate, as described in the following embodiments, the refrigeration system may be omitted or reduced in capacity. Thus, the use of the cooled non-permeate to cool the solvent in the following embodiments may increase the efficiency of the AGR system and/or decrease the capital expenditures associated with the AGR system.

In further embodiments, the cooled non-permeate may also be used for low-level heat recovery in other areas of the gas treatment unit or IGCC power plant. For example, the cooled non-permeate may be used for low-level heat recovery in a low temperature gas cooling (LTGC) system. In yet further embodiments, the expander may be coupled to other rotating equipment, such as a compressor, to use the work generated by the expander to drive the rotating equipment. For example, in certain embodiments, the PSA system may include a tail gas compressor to compress the tail gas and the expander may be used to drive the compressor. In such embodiments, the system may exclude a separate motor to drive the compressor. Alternatively, the expander may be coupled to a generator to produce electrical power. Thus, use of the expander in the following embodiments may increase the efficiency of the IGCC power plant and/or decrease the capital expenditures associated with the IGCC power plant.

Turning now to the drawings, FIG. 1 is a diagram of an embodiment of an IGCC power plant 10 that may produce and burn syngas. As discussed in detail below, the IGCC power plant 10 may include an embodiment that uses the cooled non-permeate from the expander to cool the solvent in the AGR system. Other elements of the IGCC power plant 10 may include a fuel 12, which may be a solid or a liquid, that may be utilized as a source of energy for the IGCC system. The fuel 12 may include coal, petroleum coke, oil, biomass, wood-based materials, agricultural wastes, tars, coke oven gas and asphalt, or other carbon containing items. The fuel 12 and an oxygen containing stream 14 may be passed to a gasifier 15 to convert the fuel 12 into a syngas 16, e.g., a combination of carbon monoxide (CO) and hydrogen. This resultant gas may include approximately 85 percent of CO and hydrogen in equal proportions, as well as $CH_4$, HCl, HF, COS, $NH_3$, HCN, and $H_2S$ (based on the sulfur content of the fuel 12). This resultant of gas may be termed untreated syngas 16, because it includes, for example, $H_2S$. To clean the untreated syngas 16, a gas treatment unit 18 may be utilized. In one embodiment, the gas treatment unit 18 may include a water gas shift reactor 20, an acid gas removal (AGR) system 24, a hydrogen separation system 26, a pressure swing absorption (PSA) system 28, or any combination thereof. Each of these systems are discussed in more detail below. In general, the gas treatment unit 18 may scrub the untreated syngas 16 to remove the HCl, HF, COS, HCN, and $H_2S$ from the untreated syngas 16. In other embodiments, the gas treatment unit 18 may be utilized to remove additional residual gas components, such as ammonia and methane.

In the illustrated embodiment, the gas treatment unit 18 includes a water gas shift reactor 20 that receives the untreated syngas 16 from the gasifier 15. The water shift reactor 20 may be configured to perform a water gas shift reaction, wherein the CO in the untreated syngas 16 reacts with water (e.g., steam) to form a shifted untreated syngas 30 that includes $CO_2$ and hydrogen. Specifically, the water gas shift reaction may be performed to adjust the ratio of hydrogen to $CO_2$ in the untreated syngas 16 from approximately 1 to 1 to approximately 3 to 1 in the shifted untreated syngas 30.

Next, in the illustrated embodiment shown in FIG. 1, the shifted untreated syngas 30 from the water gas shift reactor 20 may pass to the LTGC system 22. In other embodiments, the LTGC system 22 may be omitted and the shifted untreated syngas 30 from the water gas shift reactor 20 may pass directly to the AGR system 24. In further embodiments, the water shift reactor 20 may be omitted and the untreated syngas 16 from the gasifier 15 may pass directly to the LTGC system 22. As described above, the shifted untreated syngas 30 may include a higher ratio of hydrogen to $CO_2$ than the untreated syngas 16. In the LTGC system 22, the shifted untreated syngas 30 may be cooled prior to feeding the AGR system 24. Specifically, the shifted untreated syngas 30 may be cooled in a non-permeate heat exchanger 32 using a non-permeate 34 from the AGR system 24. The non-permeate 34 is cooler than the shifted untreated syngas 30. Thus, a heated non-permeate 36 is warmer than the non-permeate 34 entering the non-permeate heat exchanger 32 and an untreated syngas discharge 38 is cooler than the shifted untreated syngas 30 entering the non-permeate heat exchanger 32.

In certain embodiments of the LTGC system 22, the untreated syngas discharge 38 maybe cooled in one or more additional heat exchangers. For example, a boiler feedwater heat exchanger 40 may be used to cool the untreated syngas discharge 38 using a boiler feedwater 42 to produce steam 44 and a cooled untreated syngas 46. Thus, the cooled untreated syngas 46 is cooler than the untreated syngas discharge 38 entering the boiler feedwater heat exchanger 40. In certain embodiments, the cooled untreated syngas 46 may flow to a knockout pot 48 to be separated into liquid and vapor components, namely a condensate 50 and an untreated syngas 52, respectively. Specifically, when the untreated syngas discharge 38 is cooled in the boiler feedwater heat exchanger 40, condensate 50 may be formed, which is then removed in the knockout pot 48. In certain embodiments, the untreated syngas vapor 52 may be further cooled in a cooling water heat exchanger 54 using a cooling water supply 56 to produce a cooling water return 58 and a cooled untreated syngas vapor 60. Thus, the cooled untreated syngas vapor 60 is cooler than the untreated syngas vapor 52 entering the cooling water heat exchanger 54. In addition, the cooled untreated syngas vapor 60 may be essentially liquid-free because the condensate 50 was removed in the knockout pot 48.

After leaving the LTGC system 22 shown in FIG. 1, the cooled untreated syngas vapor 60 may flow to a feed product heat exchanger 62 to be cooled using a treated syngas 64 from the AGR system 24 to produce a heated treated syngas 66 and an untreated syngas vapor discharge 68. Thus, the feed product heat exchanger 62 may be used to further cool the cooled untreated syngas vapor 60 using a chilled stream from the AGR system 24, as described in detail below.

Turning next to the AGR system 24 shown in FIG. 1, various systems and techniques may be used to remove the $H_2S$ from the untreated syngas vapor discharge 68. For example, the AGR system 24 may use distillation techniques for the removal of the $H_2S$. In such embodiments, the untreated syngas vapor discharge 68 may be directed to an absorber 70. The absorber 70 may be a packed or trayed distillation column, or any other device capable of separating mixtures of liquids and or gases. The absorber 70 may be configured to provide a counter flow of the untreated syngas vapor discharge 68 and a solvent. Specifically, a solvent chiller 72 may be used to cool a solvent 74 to produce a cooled solvent 76 using a cooled non-permeate 78, as described in further detail below. The cooled solvent 76 may flow down the absorber 70 contacting the untreated syngas vapor discharge 68 flowing up the absorber 70. As a result, treated syngas 64 (e.g., $H_2S$-lean gas) exits the top of the absorber 70 to be used to cool the cooled untreated syngas vapor 60 in the feed product heat exchanger 62. In certain embodiment, the AGR system 24 may include additional distillation columns, such as a stripper, to regenerate the cooled solvent 76 used in the absorber 70. In further embodiments, other techniques may be used to remove the $H_2S$ from the untreated syngas vapor discharge 68.

After being used in the feed product heat exchanger 62 shown in FIG. 1, the heated treated syngas 66 from the food product exchanger 62 may flow to the hydrogen separation system 26, which may use various techniques for removing the hydrogen from the heated treated syngas 66. For example, the hydrogen separation system 26 may use membrane technology (e.g., polymer-based membranes) to preferentially permeate hydrogen from the heated treated syngas 66. Specifically, the hydrogen separation system 26 may generate a non-permeate 79 (e.g., a hydrogen-lean stream). In certain embodiments, the non-permeate 79 may be cooled in a non-permeate cooler 80 using a coolant, such as the cooling water supply 56, to produce the cooling water return 58 and a non-permeate discharge 82 from the non-permeate cooler 80. The non-permeate discharge 82 may then be directed to an expander 84 that expands and cools the non-permeate discharge 82 to produce the cooled non-permeate 78 used in the solvent chiller 72 of the AGR system 24. Specifically, the expander 84 may be an axial-flow turbine that includes a shaft 85 with blades 86 attached to the shaft 85. The non-permeate discharge 82 is expanded in the expander 84 to produce work that may be used to rotate the shaft 85 and drive a generator 88 coupled to the shaft 85. Thus, the generator 88 may be used to generate electrical power. As the non-permeate discharge 82 expands in the expander 84, which may be approximated by an isentropic process, the pressure and the temperature of the non-permeate discharge 82 may decrease to produce the cooled non-permeate 78. In certain embodiments, a temperature of the non-permeate discharge 82 may be between approximately 35 to 95 degrees Celsius and a temperature of the cooled non-permeate 78 may be less than −15 degrees Celsius. In other words, the expander 84 may cause the temperature of the non-permeate discharge 82 to decrease by approximately 25, 50, 75, 100, or more degrees Celsius. Thus, the low-temperature cooled non-permeate 78 may be used for cooling in the AGR system 24. In certain embodiments, only the solvent chiller 72 using the cooled non-permeate 78 is used to cool the solvent 74 without any other cooling system (e.g., refrigeration system). In other embodiments, the solvent chiller 72 may be used to supplement a separate refrigeration system.

Returning to the hydrogen separation system 26 shown in FIG. 1, the system 26 may also generate a permeate 90. A first hydrogen concentration of the non-permeate 79 may be less than a second hydrogen concentration of the permeate 90. In other words, the permeate 90 is a hydrogen-rich stream, which may then be passed to the PSA system 28 for further purification. Specifically, the PSA system 28 may separate hydrogen from the permeate 90 under pressure according to the molecular characteristics and affinity of hydrogen for an adsorbent material. The hydrogen may be adsorbed on the adsorbent material at high pressure and the PSA system 28 may transition, or swing, to a low pressure to desorb the hydrogen from adsorbent material. Thus, the PSA system 28 may produce a hydrogen-rich steam 92 and a tail gas 94, which may include mostly $CO_2$, some CO, and a small amount of hydrogen. Thus, the tail gas 94 may have some heating value that may be used elsewhere in the IGCC power plant 10. For example, the tail gas 94 may be compressed by a compressor 96 to produce a compressed tail gas 98. Specifically, the compressor 96 may be an axial-flow compressor that includes a shaft 95 with blades 97 attached to the shaft 95. In certain embodiments, the generator 88 may be coupled to the compressor 96 and used to rotate the shaft 95 and drive the compressor 96. In other embodiments, a motor 93 separate from the generator 86 may be used to drive the compressor 96. In further embodiments the shaft 85 of the expander 84 may be directly coupled to the shaft 95 of the compressor 96, such that the work generated by the expander 84 to rotate the shaft 85 is used to rotate the shaft 95 and drive the compressor 96. In yet further embodiments, the expander 84 and the compressor 96 may be coupled to one another, but the motor 93 may also be coupled to the compressor 96 to drive the compressor 96 when the expander 84 is not running or not producing sufficient work to drive the compressor 96.

The compressed tail gas 98 generated by the compressor 96 shown in FIG. 1 may be combined with the heated non-permeate 36 from the LTGC system 22 in a mixer 99 to produce a fuel mixture 101. In certain embodiments, the mixer 99 may be a mixing device or simply a tee-connection of two pipes. A gas turbine engine 100 may receive the fuel mixture 101 as well as compressed air and/or nitrogen to produce hot combustion gases, which drive one or more turbine stages and eventually discharge as exhaust gases 102. The gas turbine engine 100 may be used to rotate a load, such as an electrical generator for producing electrical power, in the IGCC power plant 10, for example. Indeed, the gas turbine engine 100 may be used to power any suitable device using the rotational outputs of the gas turbine engine 100.

In certain embodiments, the IGCC power plant 10 may include a heat recovery steam generator (HRSG) 104 that uses the exhaust gases 102 from the gas turbine engine 100 to heat water to produce steam used to power other equipment, such as a steam turbine engine. The HRSG 104 may include a duct burner 103 that produces a flame that causes materials, such as the compressed tail gas 98 or the fuel mixture 101, to react with oxygen to produce $CO_2$ and water in a combustion reaction. As shown in FIG. 1, either a portion of the compressed tail gas 98 or the fuel mixture 101 may flow to the duct burner 103 to be combusted. By combusting the compressed tail gas 98 or the fuel mixture 101, the duct burner 103 may be used to control internal temperatures of the HRSG 104. In certain embodiments, the duct burner 103 may be omitted or may combust materials other than the compressed tail gas 98 and the fuel mixture 101.

As shown in FIG. 1, a controller 105 may be used to control certain aspects of the IGCC power plant 10. For example, one or more sensors 106 may be disposed in the IGCC power plant 10, such as in the AGR system 24, and transmit signals 108 to the controller 105. For example, the sensor 106 may transmit information regarding a temperature of the cooled solvent 76 to the controller 105. Based on this information, the controller 105 may send one or more signals 108 to various components of the IGCC power plant 10, such as a flow control valve 107 for the cooling water supply 56 to the non-permeate cooler 80. For example, if the temperature of the cooled solvent 76 is above a threshold, the controller 105 may direct the flow control valve 107 to open to increase cooling of the non-permeate 79 in the non-permeate cooler 80, thereby decreasing the temperature of the cooled non-permeate 78 used in the solvent chiller 72 to produce the cooled solvent 76. In other embodiments, the controller 105 may be used to control a bypass valve 109 to adjust a bypass portion of the non-permeate discharge 82 around the expander 84, thereby controlling the temperature of the cooled solvent 76. Thus, the controller 105 may be used to maintain the temperature of the cooled solvent 76 below the threshold.

Figure 2:
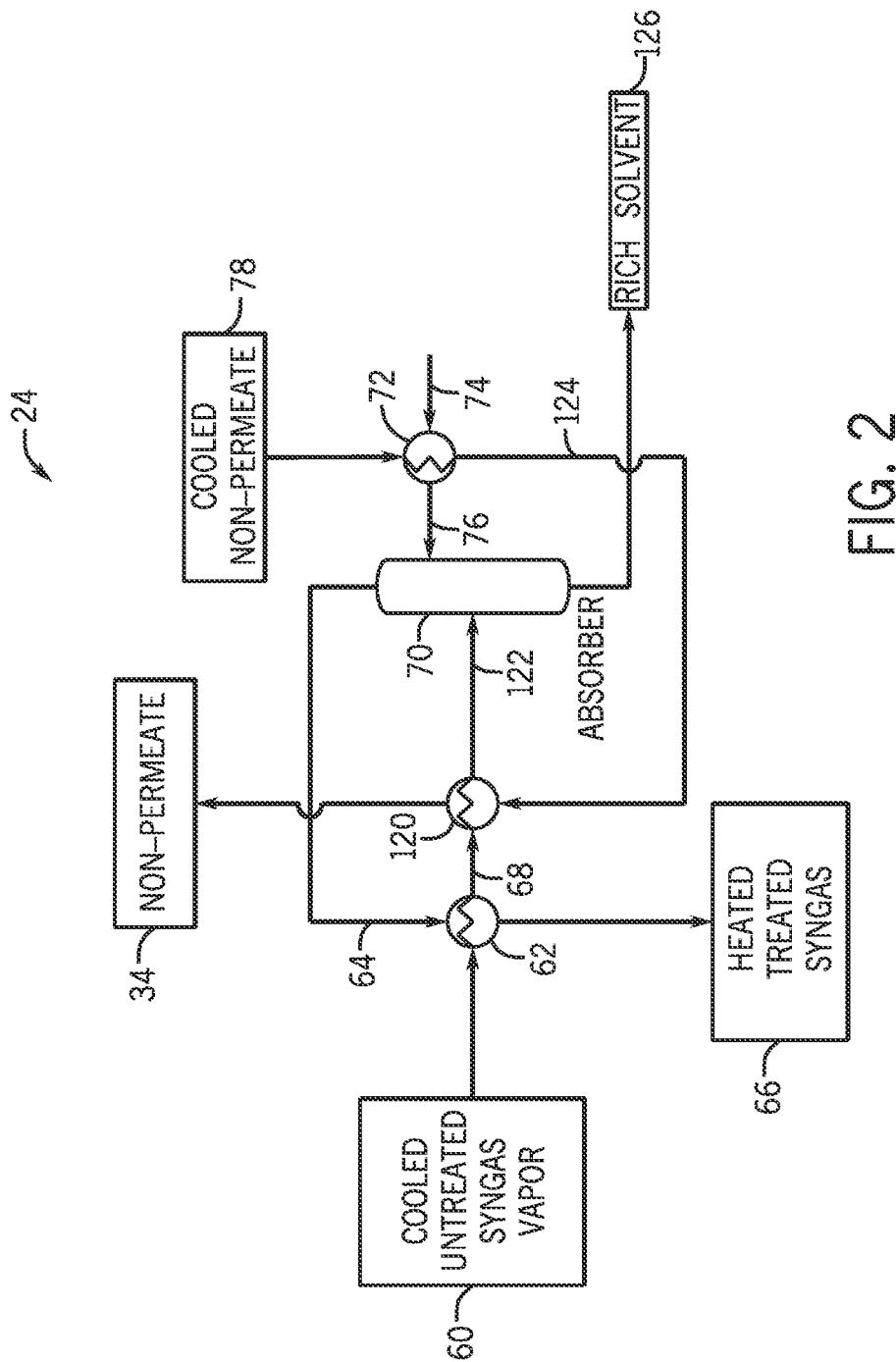
FIG. 2 is a block diagram of an acid gas recover system of FIG. 1 according to an embodiment.

FIG. 2 illustrates an embodiment of the AGR system 24. In the illustrated embodiment, an arrangement of heat exchangers in the AGR system 24 is used to achieve cooling of the cooled untreated syngas vapor 60. First, the cooled untreated syngas vapor 60 is cooled in the feed product heat exchanger 62 using treated syngas 64, as described above. Second, the untreated syngas vapor discharge 68 flows to an untreated syngas cooler 120 in FIG. 2, instead of flowing directly to the absorber 70 as shown in FIG. 1. The untreated syngas cooler 120 uses a non-permeate stream 124 from the solvent chiller 72 to further cool the untreated syngas vapor discharge 68 to produce an untreated syngas vapor 122 that is directed to the absorber 70. The non-permeate 34 from the untreated syngas cooler 120 may then flow to the non-permeate heat exchanger 32 in the LTGC system 22 as shown in FIG. 1. Thus, the illustrated embodiment shown in FIG. 2 may provide more cooling for the untreated syngas vapor discharge 68 than the shifted untreated syngas 30 compared to the embodiment illustrated in FIG. 1. As shown in FIG. 2, a rich solvent stream 126 (e.g., an $H_2S$-rich stream) exits the bottom of the absorber 70. The rich solvent stream 126 may then be directed to the stripper to regenerate the solvent by removing the $H_2S$.

As described above, certain embodiments of the IGCC power plant 10 may include the AGR system 24, the hydrogen separation system 26, and the expander 84. As described above, the AGR system 24 may remove acid gases from the untreated syngas 16 to generate the treated syngas 64. The hydrogen separation system 26 may receive the treated syngas 66 to generate the non-permeate 79 and the permeate 90. The expander 84 may generate the cooled non-permeate 78 by expanding the non-permeate discharge 82 from the hydrogen separation system 26. The AGR system 24 may include the solvent chiller 72 that cools the solvent 74 via heat exchange with the cooled non-permeate 78. In certain embodiments, the controller 105 may be used to maintain the temperature of the solvent 76 by controlling certain components of the IGCC power plant 10, such as the expander 84. By using the cooled non-permeate 78 to cool the solvent 74 used in the AGR system 24, a separate refrigeration system for cooling the solvent 74 may be omitted or reduced in capacity. Thus, the use of the cooled non-permeate 78 for cooling in the AGR system 24 may increase the efficiency of the AGR system 24 and/or decrease the capital expenditures associated with the AGR system 24.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
 an acid gas removal (AGR) system configured to remove an acid gas from an untreated syngas to generate a treated syngas,
 a hydrogen separation system configured to receive the treated syngas to generate a non-permeate and a permeate;
 a non-permeate cooler configured to cool the non-permeate via heat exchange with a coolant to produce a non-permeate discharge; and
 an expander configured to expand the non-permeate discharge to generate a cooled non-permeate, wherein the AGR system comprises a solvent chiller configured to cool a solvent via heat exchange with the cooled non-permeate to produce a heated non-permeate.

2. The system of claim 1, wherein the hydrogen separation system comprises a membrane separation system configured to generate the non-permeate and the permeate, wherein a first hydrogen concentration of the non-permeate is less than a second hydrogen concentration of the permeate.

3. The system of claim 1, wherein only the solvent chiller is used in the AGR system to cool the solvent.

4. The system of claim 1, wherein the AGR system comprises an untreated syngas cooler configured to cool the untreated syngas via heat exchange with the cooled non-permeate from the solvent chiller.

5. The system of claim 1, comprising a pressure swing adsorption (PSA) system configured to receive the permeate to generate a tail gas and a hydrogen-rich stream.

6. The system of claim 5, comprising a compressor configured to compress the tail gas to generate a compressed tail gas.

7. The system of claim 6, wherein the expander and the compressor are coupled together such that the expander generates power to drive the compressor.

8. The system of claim 6, comprising a gas turbine engine configured to receive a mixture of the compressed tail gas and the heated non-permeate from the solvent chiller.

9. The system of claim 6, comprising a duct burner of a heat recovery steam generator (HRSG), wherein the duct burner is configured to combust the compressed tail gas, or a mixture of the compressed tail gas and the heated non-permeate.

10. The system of claim 1, comprising a non-permeate heat exchanger of a low temperature gas cooling (LTGC) system, wherein the non-permeate heat exchanger is configured to cool the untreated syngas via heat exchange with the heated non-permeate from the solvent chiller.

11. A system, comprising:
 a gas treatment system, comprising:
  a hydrogen separation system configured to generate a non-permeate;
  a non-permeate cooler configured to cool the non-permeate via heat exchange with a coolant to produce a non-permeate discharge;
  an expander configured to expand the non-permeate discharge to generate a cooled non-permeate; and
  a solvent chiller configured to cool a solvent via heat exchange with the cooled non-permeate; and
 a gas treatment controller configured to control the gas treatment system to maintain a temperature of the solvent below a threshold.

12. The system of claim 11, comprising a flow control valve configured to adjust a flow of the coolant used to cool the non-permeate via heat exchange in the non-permeate cooler.

13. The system of claim 11, comprising a bypass valve configured to adjust a bypass flow of the non-permeate around the expander.

14. A method, comprising:
 generating a non-permeate in a hydrogen separation system;

cooling the non-permeate via heat exchange with a coolant in a non-permeate cooler to produce a non-permeate discharge;

expanding the non-permeate discharge in an expander to generate a cooled non-permeate;

cooling a solvent via heat exchange with the cooled non-permeate in a solvent chiller to produce a heated non-permeate; and treating a gas using the solvent in a gas treatment unit.

15. The method of claim 14, comprising:

generating a permeate in the hydrogen separation system;

receiving the permeate in a pressure swing adsorption (PSA) system;

generating a tail gas and a hydrogen-rich stream in the PSA system; and compressing the tail gas in a compressor to generate a compressed tail gas.

16. The method of claim 15, comprising mixing the compressed tail gas and the cooled non-permeate using a mixer to generate a fuel mixture.

17. The method of claim 15, comprising driving the compressor with power generated with the expander.

18. The method of claim 14, comprising cooling an untreated syngas via heat exchange with the heated non-permeate in a non-permeate heat exchanger.

19. The system of claim 1, comprising a gas turbine engine configured to receive the heated non-permeate from the solvent chiller.

20. The method of claim 14, comprising receiving the heated non-permeate in a gas turbine engine.

* * * * *